US008699395B2

(12) United States Patent
Laarhuis

(10) Patent No.: US 8,699,395 B2
(45) Date of Patent: Apr. 15, 2014

(54) METHOD AND DEVICE FOR INVERSE MULTIPLEXING OF MULTICAST TRANSMISSION

(75) Inventor: Jan Herman Laarhuis, Enschede (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 1119 days.

(21) Appl. No.: 11/575,054

(22) PCT Filed: Sep. 9, 2005

(86) PCT No.: PCT/NL2005/000651
§ 371 (c)(1),
(2), (4) Date: Jun. 13, 2008

(87) PCT Pub. No.: WO2006/028371
PCT Pub. Date: Mar. 16, 2006

(65) Prior Publication Data
US 2008/0259838 A1    Oct. 23, 2008

(30) Foreign Application Priority Data
Sep. 10, 2004    (EP) .................................... 04077507

(51) Int. Cl.
*H04H 20/71* (2008.01)
(52) U.S. Cl.
USPC ........................................................ 370/312
(58) Field of Classification Search
USPC .................. 370/311, 300, 301, 312
See application file for complete search history.

(56) References Cited

U.S. PATENT DOCUMENTS

| | | | | |
|---|---|---|---|---|
| 7,096,193 B1* | 8/2006 | Beaudoin et al. | ............... | 705/26 |
| 7,126,970 B2* | 10/2006 | Zboril | ............ | 370/535 |
| 7,212,548 B2* | 5/2007 | Bridges et | ...... | 370/473 |
| 7,269,185 B2* | 9/2007 | Kirkby et al. | ................. | 370/469 |
| 7,433,876 B2* | 10/2008 | Spivack et al. | ......... | 1/1 |
| 7,606,782 B2* | 10/2009 | Haley | .............. | 706/50 |
| 2002/0009073 A1* | 1/2002 | Furukawa et al. | ............ | 370/352 |
| 2004/0037280 A1 | 2/2004 | Hein et al. | | |
| 2004/0172658 A1* | 9/2004 | Rakib et al. | ...... | 725/120 |
| 2004/0210927 A1* | 10/2004 | Bahr et al. | ....... | 725/30 |
| 2005/0055280 A1* | 3/2005 | Jeans | .............. | 705/26 |

FOREIGN PATENT DOCUMENTS

| | | |
|---|---|---|
| EP | 1 398 938 A | 3/2004 |
| JP | 2000-244488 A | 9/2000 |
| WO | WO 01/91383 A1 | 11/2001 |
| WO | WO 02/47428 A1 | 6/2002 |
| WO | WO 03/105421 A1 | 12/2003 |
| WO | WO 2004/043019 A1 | 5/2004 |

OTHER PUBLICATIONS

International Search Report for PCT/NL2005/000651 dated Oct. 4, 2005.

\* cited by examiner

*Primary Examiner* — Mark Rinehart
*Assistant Examiner* — Mohammad Anwar
(74) *Attorney, Agent, or Firm* — Leydig, Voit & Mayer, Ltd.

(57) ABSTRACT

A stream of multicast messages is forwarded through a network to a plurality of subscriber devices (18). The stream is inverse multiplexed and transmitted distributed over a plurality of communication channels (14). A plurality of inverse demultiplexers (16) is provided, to reassemble a plurality of copies of the stream from the multiplexed streams from the communication channels at different locations. Preferably, the final communication channels to a plurality of subscribers (e.g. telephone lines to different homes) are used as communication channels for said inverse multiplexing and the inversely multiplexed data is communicated locally (17) between the subscribers to enable reassembly of copies of the stream.

17 Claims, 3 Drawing Sheets

METHOD AND DEVICE FOR INVERSE MULTIPLEXING OF MULTICAST TRANSMISSION

FIELD OF THE INVENTION

The invention relates to a communication network, a method of operating such a network and devices for use in such a network. The invention relates in particular to multicast transmission of messages through the communication network.

BACKGROUND

Messages in a network such as the Internet can be distinguished into unicast messages, broadcast messages and multicast messages. The difference between these types of messages involves addressing of these messages. A unicast message is addressed at a single terminal of the network, a broadcast message is addressed at all terminals of the network and a multicast message is addressed at a group of a plurality of the terminals of the network.

A multicast message typically includes a group address as a destination address, rather than the addresses of individual terminals. In principle such a multicast message could be broadcast to all terminals of the network, each terminal inspecting the messages for the presence of a group address to determine whether the message is relevant for the terminal. In large networks, however, multicast routers are used to restrict transmission of multicast messages to relevant terminals. This means that the multicast routers must have information about the terminals that need to receive multicast messages with specific group addresses. When a host in the network indicates that it has to receive multicast messages with a specific group address, a multicast router records that messages with that group address must be routed to the terminal to which the host is connected. The multicast router can record this for a plurality of terminals, so that it will route copies of the multicast message to the plurality of terminals.

In a co-pending patent application, which is assigned to the same assignee, and unpublished at the priority date of the present application, it has been described how different subscribers of a telephone network can share each others' subscriber lines to provide high peak bandwidth, using inverse multiplexing of message traffic. For this purpose, an inverse multiplexer is provided (typically in a telephone exchange) that distributes message traffic for one subscriber over the subscriber lines of a plurality of subscribers. At each subscriber site an inverse demultiplexing device is provided. The inverse demultiplexing devices of different subscribers are cross-connected to communicate inversely multiplexed messages, and each inverse demultiplexing device is arranged to reassemble a message stream for its subscriber by means of inverse demultiplexing. In this way decentralized inverse demultiplexing is used to reassemble the streams for different terminals. The destination of the messages determines which of the demultiplexing devices will reassemble the message stream.

This inverse demultiplexing scheme is preferably implemented so that it is transparent for the remainder of the network, including multicast routers. This means that this scheme can readily be combined with all network functions, including multicast transmission.

A set of inversely multiplexed lines may be used downstream from a multicast router. If a single terminal is located downstream of the inversely multiplexed lines this requires no additional measures: the stream of multicast messages is inversely multiplexed and demultiplexed on its way to the terminal if the terminal has subscribed to the multicast stream. If more than one potential subscribers are located downstream of the inversely multiplexed lines two multicast routers are preferably used, one upstream of the inversely multiplexed lines and one downstream, so that the upstream multicast router will send a stream of multicast messages to the downstream multicast router via the inverse multiplexed lines and the downstream multicast router will send copies of the stream to different subscribers terminals (or further multicast routers).

However, this has the disadvantage that a central multicast router is needed downstream of the inversely multiplexed lines. This downstream multicast router may form a bottleneck for message traffic.

SUMMARY OF THE INVENTION

Among others, it is an object of the invention to improve the efficiency of transmission of multicast messages to different terminals over inversely multiplexed connections.

Among others, it is a further object of the invention to improve the efficiency of transmission of multicast messages to different terminals over inversely multiplexed connections, when decentralized inverse demultiplexing is used.

Among others, it is an object of the invention to combine the efficiency of transmission of multicast messages to different terminals over inversely multiplexed connections with as much transparency as possible of the use of inverse multiplexing.

A method according to the invention is set forth in claim 1. A stream of multicast messages is forwarded through a network to a plurality of subscriber devices. The stream is inverse multiplexed and transmitted distributed over a plurality of communication channels. A plurality of inverse demultiplexers is provided, to reassemble a plurality of copies of the stream from the multiplexed streams from the communication channels at different locations. Thus a distribution of the multicast stream to different subscriber devices takes place at a stage where the multicast stream is still inversely multiplexed. That is, a single multicast stream for a group address is inversely multiplexed and this inversely multiplexed stream is then distributed to a plurality of inverse demultiplexing devices each for a respective device that has subscribed to the stream.

Preferably, a plurality of forwarding devices is provided, connected to different inversely multiplexed communication channels, each to forward a respective inversely multiplexed part of the stream to a plurality of inverse multiplexing devices. In this case subscription information, which indicates which of the inverse multiplexing devices are coupled to subscribed devices, is preferably sent to and stored in all of the forwarding devices so that each forwarding device is able to control to which of the inverse demultiplexing devices the inversely multiplexed parts of the stream will be forwarded. In an embodiment, forwarding involves transmission of respective copies to different inverse demultiplexing devices. In another embodiment, a broadcast medium is used to send the inversely multiplexed parts of the stream to all inverse demultiplexing devices, at least if at least one inverse demultiplexing device of a subscriber is not coupled directly to the forwarding device. Preferably, the forwarding device provides for acknowledgement of reception of the inversely multiplexed parts from selected inverse demultiplexing devices that have been recorded to serve subscribers of the multicast stream.

On the upstream side of the inversely multiplexed communication channels a record of the different subscribed devices is preferably kept to determined whether transmission of the stream of multicast messages must be continued. Once transmission of the stream has started after subscription of a first device no modification is made to the transmission when subscription of further devices is recorded. Transmission of the stream is discontinued only when it has been recorded that subscription of all devices to the stream has been cancelled.

Preferably the method is applied to inverse multiplexing of information delivered over local loop telephone subscriber lines, to nearby homes of different subscribers. In this way the different subscribers can share the bandwidth of their telephone lines. Preferably, in this case the inversely multiplexed stream is forwarded by wireless radio transmission between the different homes to inverse demultiplexing devices in each home. Preferably the method is applied to delivery of video and/or audio channels.

BRIEF DESCRIPTION OF THE DRAWINGS

These and other objects and advantageous aspects of the invention will become clear from the description of the accompanying figures, which illustrate the invention by means of non-limitative examples.

DETAIL DESCRIPTION OF THE DRAWINGS

Figure 1:
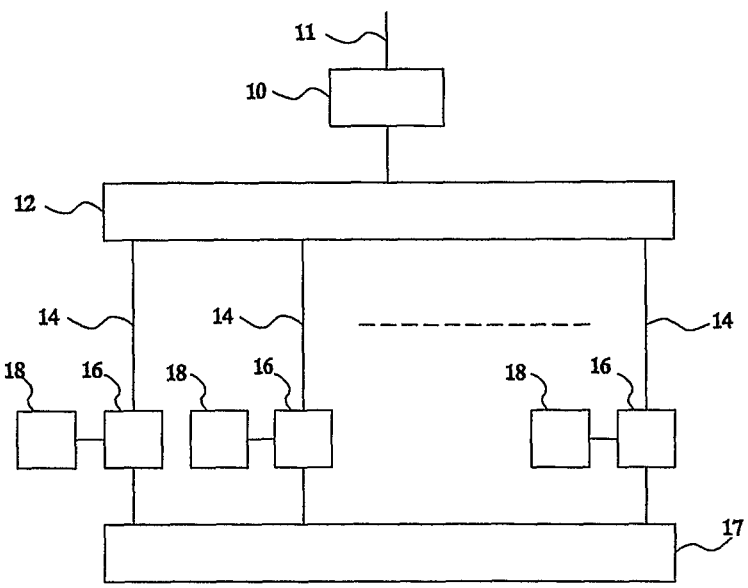
FIG. 1 shows part of a network

FIG. 1 shows a part of a network, comprising a multicast router 10, an inverse multiplexing device 12, a plurality of functionally parallel connections 14, a plurality of inverse demultiplexing/forwarding devices 16, a local network 17 and a plurality of hosts 18. Multicast router 10 has a network connection 11 to a further part of the network (not shown) and a connection to inverse multiplexing device 12. Inverse multiplexing device 12 is connected to the inverse demultiplexing/forwarding devices 16, each via a respective one of the functionally parallel connections 14. Inverse demultiplexing/forwarding devices 16 are coupled to each other via local network 17. Each inverse demultiplexing/forwarding device 16 is coupled to a respective one of the hosts 18. Although three connections 14 with attached inverse demultiplexing/forwarding devices 16 and hosts 18 are shown, it should be understood that in practice a larger number will typically be used, but it is also possible to use two connections 14.

The further part of the network (not shown) that is connected to connection 11 typically contains various conventional sources of multicast streams and any number of further multicast routers and other routers that may be arranged in a conventional way to supply messages to input 11.

In operation the network part realizes message traffic between network connection 11 and hosts 18. A stream of messages for hosts 18 is received at network connection 11 and sent to inverse multiplexing device 12, which distributes the stream over connections 14 by means of inverse multiplexing, e.g. according to a round robin distribution scheme. Each inverse demultiplexing/forwarding device 16 receives those messages of the stream that have been sent over the connection 14 to which the inverse demultiplexing/forwarding device 16 is connected. The inverse demultiplexing/forwarding device 16 forwards these messages to other inverse demultiplexing/forwarding devices 16 if the messages are needed by hosts 18 other than the host that is connected to the inverse demultiplexing/forwarding device 16. The connected inverse demultiplexing/forwarding device 16 of that host 18 reassembles a stream from the messages that it receives from its connection 14 and from the other inverse demultiplexing/forwarding devices 16, by means of inverse demultiplexing.

Conventional message formats and protocols, such as used in telecommunications equipment, and/or for Internet communication may be used for transmission of the messages. Similarly, conventional message transmission equipment, such as telecommunication (telephone network) equipment or computer networking equipment may be used to perform message transmission, the equipment being modified (e.g. reprogrammed) to perform inverse multiplexing and inverse demultiplexing. Alternatively, additional inverse multiplexing and inverse demultiplexing equipment may be added.

Each messages contains a destination address. In the case of a unicast message the destination address identifies a specific host 18. In the case of a multicast message the address specifies an abstract group. Individual ones of hosts 18 may indicate whether they want to receive multicast messages with the address of the group.

In the case of unicast messages inverse demultiplexing/forwarding device 16 can handle the messages on the base of their destination address: if the address is of another host than the host 18 to which the inverse demultiplexing/forwarding device 16 is connected, the inverse demultiplexing/forwarding device 16 forwards the message to the inverse demultiplexing/forwarding device 16 to which the addressed host 18 is connected. If the address is of the host to which the inverse demultiplexing/forwarding device 16 is connected, the inverse demultiplexing/forwarding device 16 uses the message, together with messages from the other inverse demultiplexing/forwarding devices, to reassemble the stream of messages for its host 18.

For the case of multicast messages each inverse demultiplexing/forwarding device 16 stores information that indicates for one or more group addresses which of hosts 18 have to receive multicast messages that have that group address. For each multicast message that the inverse demultiplexing/forwarding device 16 receives from its connection 14, the inverse demultiplexing/forwarding device 16 compares the group address with the group address (or addresses) for which information is stored. If the address matches and the information indicates that a host 18 other than the host 18 that is connected to the inverse demultiplexing/forwarding device 16 has to receive multicast messages with the group address, the inverse demultiplexing/forwarding device 16 forwards the multicast message via local network 17 to the inverse demultiplexing/forwarding device 16 that is connected to the relevant host 18. The inverse demultiplexing/forwarding device 16 reassembles the multicast stream from multicast messages with a common group address if its information indicates that its host 18 has to receive the stream with that group address. In this case the inverse demultiplexing/forwarding device 16 uses messages that it receives from its connection 14 and the other inverse demultiplexing/forwarding devices 16 to reassemble the stream.

In the network part that is shown in FIG. 1 the inverse demultiplexing/forwarding devices 16 preferably are devices that combine the function of forwarding and inverse multiplexing each in a single apparatus located at the site of a subscriber of a telephone line that forms connection 14, e.g. at the house of the subscriber. In an embodiment these apparatuses contain receivers and transmitters for electromagnetic radiation to form the local network 17. However, of course, wired connections between these apparatuses may be used to form the local network 17 instead. Instead of a local network a set of point-to-point connections between inverse demultiplexing/forwarding devices 16 may be used to cross-couple the inverse demultiplexing/forwarding devices 16.

Figure 2:
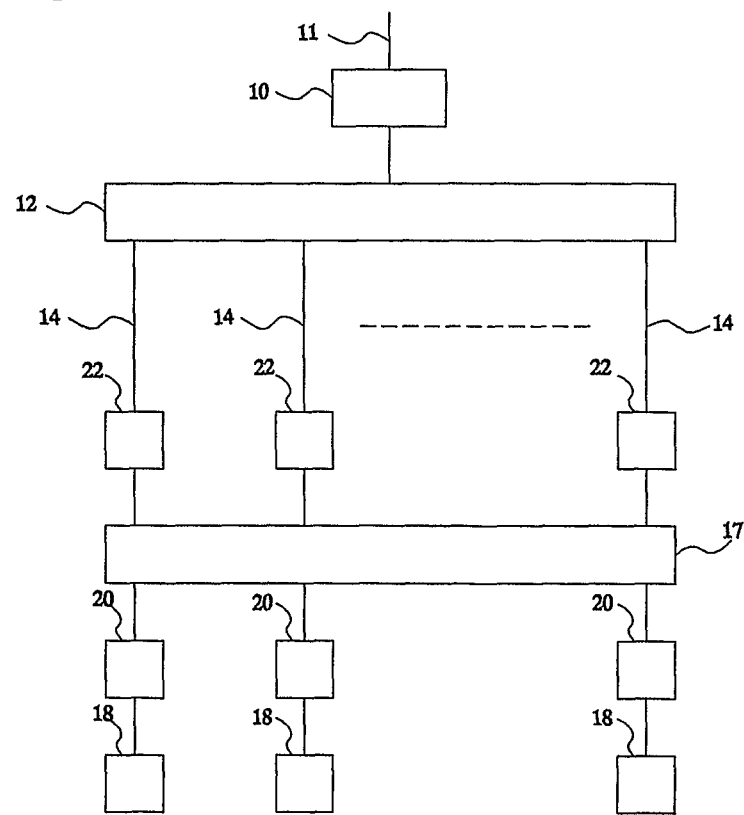
FIG. 2 shows an alternative embodiment of part of a network

FIG. 2 shows an embodiment of a different network organization. In this embodiment the functions of forwarding and inverse demultiplexing have been separated. Forwarding units 22 and inverse demultiplexing devices 20 are provided, Forwarding units 22 are coupled between respective connections 14 and local network 17. Inverse multiplexing devices 20 are coupled between hosts 18 and local network 17. In this embodiment forwarding units 22 use the destination addresses of messages to determine to which of the demultiplexing devices 20 messages will be forwarded via local network 17. In this embodiment forwarding units 22 record the information that indicates, for one or more group addresses, which hosts 18 need to receive multicast messages with those group addresses. When a forwarding unit 22 receives a multicast message at its connection 14 the forwarding unit 22 uses the information to determine to which of demultiplexing devices 20 the forwarding unit 22 will forward the multicast message through local network 17.

Hosts 18 preferably send "join" messages to indicate the group address or group addresses of multicast messages that the hosts 18 want to receive.

Figure 3:
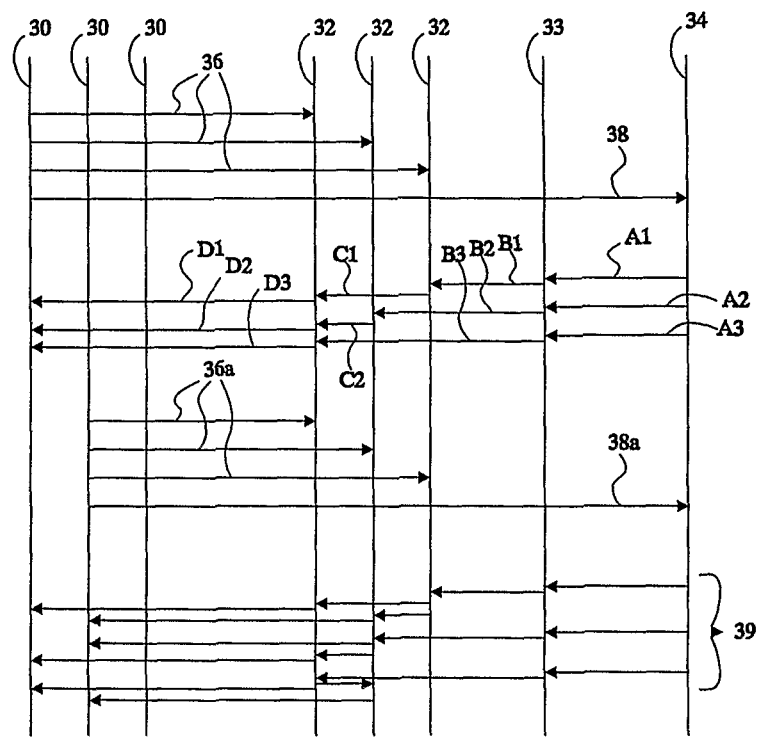
FIG. 3 shows signal exchanges for multicast

FIG. 3 shows a timing diagram of a first embodiment of message traffic to establish a stream of multicast messages to a host. Time evolution is represented vertically. Vertical lines 30 symbolize different hosts 18. Vertical lines 32 symbolize different inverse multiplexing devices 16. Vertical line 33 symbolizes inverse multiplexer 12. Vertical line 34 symbolizes multicast router 10. Horizontal lines with arrows symbolize messages.

When a host 18 indicates that it has to receive multicast messages with a specific group address, that host 18 first sends "join" messages 36 specifying that group address to all inverse multiplexing devices 16. In response to these messages multiplexing devices 16 record that messages with the specified group address must be forwarded. The multiplexing device 16 that is connected to the host 18 preferably records that those messages must be forwarded to the host 18 and the other multiplexing device preferably records that those messages must be forwarded to the multiplexing device 16 that is connected to the host.

Subsequently, the host 18 sends a join message 38 to the multicast router 10, specifying the group address. In response the multicast router records that multicast messages with that group address must be forwarded to inverse multiplexer 12.

It should be appreciated that FIG. 3 schematically illustrates the effective end-to-end information flow due to join messages, rather than a particular implementation of the join messages. In practice this end-to-end information flow may be realized by a series of messages and/or signals wherein one signal in the series triggers the next. For example, a host 18 may send a join message to some multicast administrator device (not shown), which subsequently sends signals to update control information in multicast router 10 and inverse demultiplexing/forwarding devices 16.

Figure 3A:
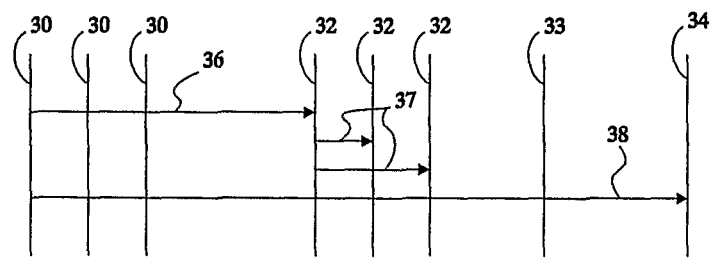
FIGS. 3a-c show alternative signal exchanges

FIG. 3a shows a further embodiment wherein the host 18 sends a join message 36 to its particular connected multiplexing device 16, specifying the group address. In this embodiment the particular multiplexing device 16 sends auxiliary join messages 37 to the other multiplexing devices 16, each auxiliary join message 37 indicating that those multiplexing devices 16 must forward multicast messages with the specified group address to the particular multiplexing device 16.

Figure 3B:
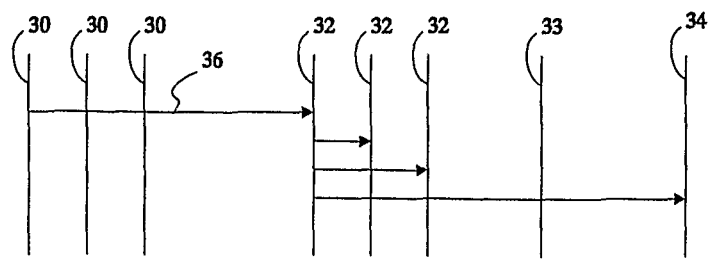

FIG. 3b shows an embodiment that may be combined with the embodiments of FIGS. 3 and 3a, wherein the particular connected multiplexing device 16 of the host sends a further auxiliary join message to multicast router 10 instead of the direct message from the host 18. In this embodiment the further auxiliary join message indicates that multicast router 10 must forward multicast messages with the specified group address to the inverse multiplexer 12.

Figure 3C:
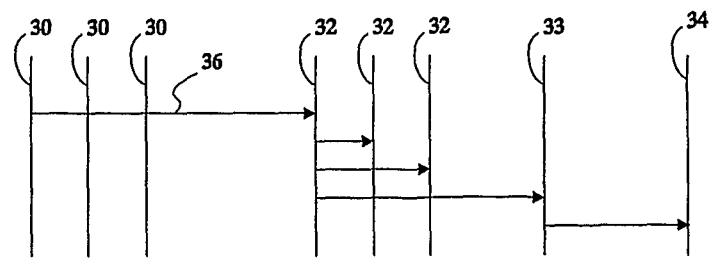

FIG. 3c shows yet another embodiment wherein the particular connected multiplexing device 16 of the host (or the host itself) sends a join message addressed to inverse multiplexing device 12 instead of to multicast router 10. In this embodiment inverse multiplexing device 12 sends an auxiliary join message to multicast router 10 to indicate that multicast router 10 must forward multicast messages with the specified group address to the inverse multiplexer 12.

Once multicast router 10 and inverse demultiplexing/forwarding devices 16 have recorded information in response to the join messages, multicast messages can be routed to hosts 18.

FIG. 3 shows an example of how multicast messages A1, A2 and A3 with the same group address are routed from multicast router 10. Inverse multiplexing device 12 routes copies B1, B2 and B3 messages via respective different connections 14, to different inverse demultiplexing/forwarding devices 16. One of the inverse demultiplexing/forwarding devices 16 has recorded that its host 18 needs to receive the multicast messages with the group address. This inverse demultiplexing/forwarding device 16 uses the message B3 from connection 14 to forward a message D3 to its host 18. The other inverse demultiplexing/forwarding devices 16 have recorded that the multicast message with the group address must be forwarded, which is done by sending messages C1, C2 to the particular inverse demultiplexing/forwarding device 16 that is connected to the host 18 that needs to receive the multicast messages with that group address. This particular inverse demultiplexing/forwarding device 16 uses the messages C1, C2 from the other inverse demultiplexing/forwarding devices 16 to forward message D1, D2 to its host 18.

Subsequently another host may send join messages 36a,b. In one embodiment these join messages are sent to inverse demultiplexing/forwarding devices 16 and multicast router 10. Inverse demultiplexing/forwarding devices 16 and multicast router 10 record the information. The other embodiments that have been described for sending join messages for the first host may be used as well.

Multicast router 10 does not change its behaviour in response to the information from the join messages: multicast router 10 continues to send only one copy of each multicast message to inverse multiplexing device 12. In addition multicast router 10 merely records that more than one host 18 now has to receive multicast messages with a specified group address, to ensure that multicast router 10 will continue forwarding the multicast messages at least when it has not been detected that all of those hosts no longer need to receive the multicast messages. This is shown by means of messages 39.

Inverse demultiplexing/forwarding devices 16 change their behaviour in response to the join messages: they will now forward copies of the multicast messages to a plurality of the other inverse demultiplexing/forwarding devices 16, and more than one of the inverse demultiplexing/forwarding devices will reassemble the stream of messages with the group addresses and deliver the reassembled stream to its host 18. This is shown by means of messages 39.

It should be appreciated that a similar operation occurs in the embodiment of FIG. 2. In this case join messages are sent to forwarding units 22 to make that forwarding units forward multicast messages with a specified address to selected inverse demultiplexing devices 20 for reassembly of the multicast stream and delivery to the connected host 18.

Figure 4:
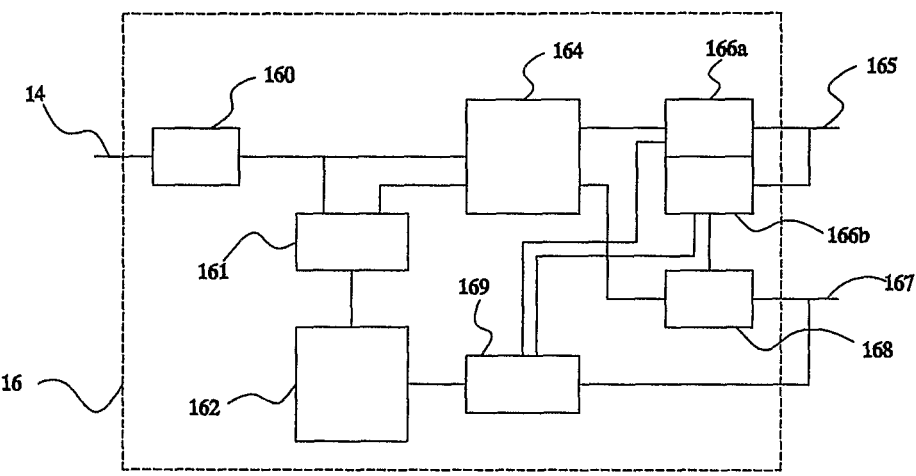
FIG. 4 shows an inverse demultiplexing/forwarding device

FIG. 4 shows an example of an inverse demultiplexing/forwarding device 16. The device contains a transceiver 160 coupled to one of the connections 14 to inverse multiplexer 12 (not shown). Transceiver 160 is coupled to a multicast address comparator circuit 161, which in turn is coupled to a multicast subscription memory 162. Multicast subscription memory 162 stores multicast group addresses, each in association with addresses of inverse demultiplexing devices for hosts 18 that have subscribed to a multicast stream with that group address.

The inverse demultiplexing/forwarding device 16 contains a forwarding circuit 164, an inverse demultiplexer 168 and a wireless transceiver 166a,b. When comparator circuit 161 detects that an incoming message carries a group address that corresponds to an address in memory 162, comparator circuit 161 signals to a forwarding circuit 164 that the multicast message must be forwarded to the inverse demultiplexing devices that have been recorded in memory 162.

If the multicast message must be forwarded to local inverse demultiplexing device 168 forwarding circuit 164 forwards the multicast message accordingly. If the multicast message must be forwarded to remote demultiplexing devices, forwarding circuit 164 forwards the multicast message to a transmitter part 166a of wireless transceiver 166a,b which transmits the multicast message to the remote demultiplexing devices via a wireless input/output 165.

A receiver part 166b of wireless transceiver 166a,b receives multicast messages from remote forwarding devices via a wireless input/output 165.

Inverse demultiplexing device 168 has a connection 167 to a local host (not shown). If the local host has subscribed to a stream of multicast messages inverse demultiplexing device 168 receives inversely multiplexed multicast messages from the local forwarding circuit 164 and from the receiver part 166b and inversely demultiplexes the stream of multicast messages. Inverse demultiplexing device 168 transmits the inversely demultiplexed stream to the connection 167 for the local host.

Furthermore, inverse demultiplexing/forwarding device 16 contains a subscription control circuit 169. Subscription control circuit 169 receives join messages from the local host via connection 167. In response subscription control circuit 169 records the subscription in memory 162 and causes transmitter part 166b to forward the join message to other inverse demultiplexing/forwarding devices 16. Receiver part 166b receives join messages from other inverse demultiplexing/forwarding devices 16. In response to such join messages subscription control circuit 169 records (in memory 162) the subscriptions of hosts that are connected to the other inverse demultiplexing/forwarding devices 16.

The inverse demultiplexing/forwarding devices 16 of this embodiment use a wireless network to implement local network 17. However, it should be understood that other types of network may be used, with correspondingly different transceiver 166a,b. Like the wireless network such a local network may be a broadcast local network 17, wherein all receiver parts 166b have access to all messages. In such a broadcast embodiment, inverse demultiplexing/forwarding devices 16 or forwarding units 22 may be arranged to broadcast all multicast messages if there is at least one subscription. In this embodiment the demultiplexing/forwarding devices 16 or the demultiplexing devices 20 receive the join messages for specific group addresses from their host 18. A particular demultiplexing device for which a join message has been received in this embodiment responds by selecting the multicast messages with the specified group address from the local network 17, to reassemble the multicast stream for delivery to its host.

In many applications there is no need to acknowledge reception of multicast messages. However, in other applications it may be desirable to provide for return of acknowledgment signals, from the inverse multiplexing device that has to perform inverse demultiplexing or those of the inverse multiplexing devices that have to perform inverse demultiplexing, in response of reception of multicast messages.

Figure 5:
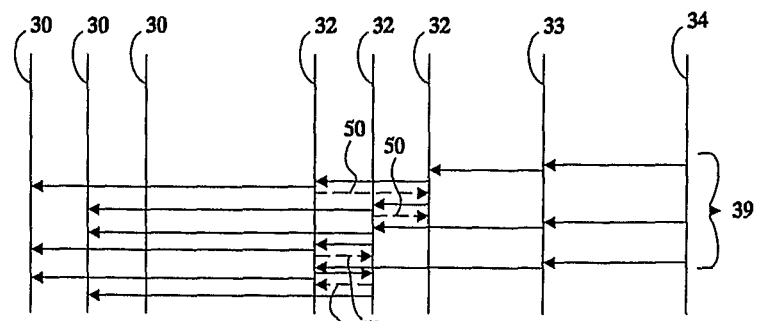
FIG. 5 shows acknowledge signals

FIG. 5 shows an example of acknowledgement signals 50 that are returned by the inverse multiplexing devices 16. When acknowledgment signals are used the transmission devices that transmit multicast messages to the inverse demultiplexing devices, preferably use stored information to indicate from which of the demultiplexing devices acknowledgement signals should be received. In this case the device that transmits multicast messages to the inverse demultiplexing devices can be arranged to retransmit a multicast message if at least one of the demultiplexing devices for which this information is stored does not return an acknowledgement signal.

Preferably, a "leave messages" from a host 18 is used to indicate when a host no longer needs to receive multicast messages with specific group addresses (or with any group addresses). The host 18 transmits these messages directly or indirectly to multicast router 10 and subsequently to all inverse demultiplexing devices 16 (or 20), or to forwarding units 22. In response inverse demultiplexing devices 16 (or 20), or to forwarding units 22 remove their recorded information that the host has to receive the multicast messages.

In response to a leave message multicast router 10 records that the host no longer need to receive multicast messages with the specified address (or any address). When multicast router 10 has recorded that other ones of hosts 18 still need to receive multicast messages with the specified address it simply continues sending a single copy of each multicast message to inverse multiplexing device 12. Once multicast router 10 has recorded that none of hosts 18 still need to receive multicast messages with the specified address multicast router 10 responds to the leave message by discontinuing sending of copies of the multicast messages to inverse multiplexing device 12.

Although the invention has been illustrated by means of specific embodiments it should be appreciated that the invention is not limited to these embodiments. For example, although the invention has been described for the case wherein multiple multicast streams are available, each with a different group address, so that different hosts can select which of the multicast streams they want to subscribe to, it will be understood that without deviating from the invention only one multicast stream may be used, so that no group address needs to be specified, or that hosts may use other means of selecting groups instead of group addresses, such as index values for a table of group addresses that is stored in the relevant devices As another example, although a separate multicast router 10 and inverse multiplexing device 12 have been shown, it should be understood that these devices may be combined into one device, do that inverse multiplexing device 12 is coupled directly to input 11 and forwards multicast messages of with a specific group address if it has recorded that at least one of the connected hosts 18 need to receive multicast messages with that group address.

As another example multicast router 10 may be split into a first device that handles multicast messages (and other messages) and a second device that processes join messages by adapting the programming of the first device. As a further example, although messages from input 11 are preferably transmitted unmodified from input 11 to hosts, in a more complex embodiment modified messages may be used for transmission to the hosts, such as messages obtained by splitting the content from a message that is received at input 11, or, conversely, by combining the content of a plurality of messages that are received at input 11. Also the devices may be arranged to modify the multicast messages by replacement of the multicast address by some other address that will be recognized by other devices. Furthermore inverse demultiplexing devices 16, 20 may be arranged to discard the message structure altogether so as to reconstruct a stream of data from the content of the messages in a stream of messages.

As yet another example, although it is preferred that multicast router 10 sends only a single copy of each needed multicast message to inverse multiplexing device, it should be understood that it is also possible to send multiple copies, one for each host. In this case, inverse multiplexing device 12 may be arranged to discard all but one of the copies (e.g. all later copies) of a multicast message so that only one copy is forwarded through the inversely multiplexed connections 14. This results in increased bandwidth when the bandwidth of those connections 14 is the bottleneck of the network, even if the connection between multicast router 10 and inverse multiplexing circuit 12 is not optimally used.

Furthermore, although the invention has been described for an implementation wherein connections 14 are local loop telephone subscriber lines (e.g. to the building of a subscriber), it should be understood that other types of connections 14 may be use, such as for example lines to a subscriber in a cable TV system, or any other communication channels over which information can be transmitted in parallel.

All of the devices, units, hosts and the multicast router 10 may be implemented as suitably programmed programmable computer circuits with I/O interfaces to receive and transmit messages. But instead, some or all of the devices etc. may be dedicated circuits that are permanently arranged to perform their respective functions. For example, hosts 18 may be programmable computers, but they may also be audio and/or video equipment that are arranged to receive and render a television and/or radio channel using information from a multicast stream.

Furthermore, it should be realized that various further measures may be taken, for example, it may be desirable to provide buffers in the inverse multiplexing devices or forwarding units to even out delay differences between different multicast messages.

The invention claimed is:

1. A method of forwarding a stream of multicast messages through a network by transmitting a stream of multicast messages from a multicast router to a multicast subscriber device and a further multicast subscriber device, the method comprising:
   inverse multiplexing the stream of multicast messages, thereby converting the stream of multicast messages into multiple parts, each part being transmitted via one of a plurality of communication channels:
   inverse demultiplexing the multiple parts of the multicast messages of the inversely multiplexed stream with an inverse demultiplexer for the multicast subscriber device; and
   forwarding, by a plurality of forwarding devices coupled to respective ones of the plurality of communication channels, respective ones of the multiple parts of the inversely multiplexed stream from the plurality of communication channels to a further inverse demultiplexer of the further multicast subscriber device.

2. The method according to claim 1, the method comprising
   supplying subscription information to all of said plurality of forwarding devices to indicate whether the multicast subscriber device and/or the further multicast subscriber device have subscribed to the stream of multicast messages; and
   using, by the plurality of forwarding devices, the subscription information to control forwarding of the respective parts of the inversely multiplexed stream of multicast messages from the forwarding devices to the inverse demultiplexer and the further inverse demultiplexer.

3. The method according to claim 2, wherein at least one of the forwarding devices receives a particular one of the multiple parts from a respective one of the communication channels, the method further comprising transmitting respective copies of the particular one of the multiple parts from said at least one of the forwarding devices to the multicast subscriber device and the further multicast subscriber device, when the subscription information indicates that both the multicast subscriber device and the further multicast subscriber device have subscribed to the stream of multicast messages.

4. The method according to claim 2, comprising:
   sending acknowledging signals for messages from the respective parts of the multiple parts of the inversely multiplexed stream from the inverse demultiplexing devices to the forwarding devices;
   testing, in one of the plurality of forwarding devices, whether acknowledge signals have been received for a particular one of the messages; and
   retransmitting, by said one of the plurality of forwarding devices, said particular one of the messages if the forwarding device does not detect acknowledge signals from all of the inverse demultiplexing devices that have subscribed to the multicast stream according to the subscription information in said one of the plurality of forwarding devices.

5. The method according to claim 2, the method comprising:
   supplying further subscription information to the multicast router to indicate whether the multicast subscriber device and/or the further multicast subscriber device have subscribed to the stream of multicast message;
   starting transmission of multicast messages from the stream from the multicast router once it has been indicated that a first one of the multicast subscriber device and the further multicast subscriber device has subscribed to the multicast stream:
   not modifying transmission of multicast messages from the stream from the multicast router once it is indicated that a second one of the multicast subscriber device and the further multicast subscriber device also has subscribed to the multicast stream; and
   discontinuing transmission of the multicast messages from the multicast router once it has been indicated that none of a plurality of multicast subscriber devices, including the multicast subscriber device and the further multicast subscriber device still subscribe to the multicast stream.

6. The method according to Claim 1, wherein local loop telephone subscriber lines are used for the plurality of communication channels, the multicast subscriber device and the further multicast subscriber device being located at respective homes where the local loop telephone subscriber lines terminate.

7. The method according to claim 6, wherein the inversely multiplexed stream is forwarded by wireless radio transmission between the different homes.

8. The method according to claim 1, further comprising rendering video and/or audio information that is encoded in the stream of multicast messages at the multicast subscriber device and the further multicast subscriber device.

9. A communication system, comprising:
a multicast router, arranged to transmit a stream of multicast messages;
a plurality of functionally parallel communication channels;
an inverse multiplexing device, coupled between the multicast router and the plurality of communication channels, arranged to inversely multiplex the stream of multicast messages, thereby converting the stream of multicast messages into multiple parts, each part being transmitted over a respective one of the plurality of communication channels;
a plurality of inverse demultiplexing devices;
multicast subscriber devices coupled to respective ones of the inverse demultiplexing devices; and
a plurality of forwarding devices each coupled to the inverse multiplexing device via a respective one of the plurality of communication channels, and arranged to distribute the inversely multiplexed stream of multicast messages to the plurality of inverse demultiplexing devices, wherein each of the inverse demultiplexing devices is adapted to:
receive the multiple parts of the multicast messages of the inversely multiplexed stream distributed by the plurality of forwarding devices, and
inverse demultiplex the multiple parts of the multicast messages to render the stream of multicast messages.

10. The communication system according to claim 9, wherein all of said plurality of forwarding devices are arranged to receive and store subscription information that indicates which of the multicast subscriber devices have subscribed to the stream of multicast messages, and the plurality of forwarding devices are arranged to use the subscription information to control to which of the plurality of inverse demultiplexing devices respective parts of the inversely multiplexed stream are forwarded that are received via respective ones of the plurality of communication channels.

11. The communication system according to claim 10, wherein at least one of the plurality of forwarding devices receives a particular one of the multiple parts, of the inverse multiplexed stream of multicast messages, from its respective one of the communication channels, and transmits respective copies of the particular one of the parts to respective selected ones of the multicast subscriber devices for which the subscription information indicates that the respective selected ones of the subscriber devices have subscribed to the multicast stream.

12. The communication system according to claim 10, wherein at least one of the plurality of forwarding devices receives a particular one of the parts from its respective one of the plurality of communication channels, and tests for acknowledgments of reception of the particular one of the parts from selected ones of the multicast subscriber devices for which the subscription information indicates that the selected ones of the subscriber devices have subscribed to the multicast stream.

13. The communication system according to claim 11, wherein the multicast router is arranged to receive and store further subscription information to indicate which of the multi cast subscriber devices have subscribed to the stream of multicast message; the multicast router:
starting transmission of multicast messages from the stream from the multicast router once it has been indicated that a first one of the multicast subscriber device and the further multicast subscriber device has subscribed to the multicast stream;
not modifying transmission of multicast messages from the stream from the multicast router once it is indicated that a second one of the multicast subscriber device and the further multicast subscriber device also has subscribed to the multicast stream; and
discontinuing transmission of the multicast messages from the multicast router once it has been indicated that none of a plurality of multicast subscriber devices, including the multicast subscriber device and the further multicast subscriber device, still subscribe to the multicast stream.

14. The communication system according to claim 10, further comprising local loop telephone subscriber lines that serve as at least part of the plurality of communication channels, the multicast subscriber device and the further multicast subscriber device being located at respective homes where the local loop telephone subscriber lines terminate.

15. The communication system according Co claim 10, wherein the forwarding devices are arranged to forward respective inverse multiplex parts of the stream by wireless radio transmission between each other.

16. The communication system according to claim 10, further comprising video and/or audio rendering devices coupled to respective ones of the inverse demultiplexing devices, and arranged to render video and/or audio information that is encoded in the stream of multicast messages.

17. A forwarding device arranged for use as one of a set forwarding devices of a system, the system comprising:
a multicast router, arranged to transmit a stream of multicast messages;
a plurality of functionally parallel communication channels;
an inverse multiplexing device, coupled between the multicast router and the plurality of communication channels, arranged to inversely multiplex the stream of multicast messages, thereby converting the Stream of multicast messages into multiple parts, each part being transmitted over a respective one of the plurality of communication channels;
a plurality of inverse demultiplexing devices;
multicast subscriber devices coupled to respective ones of the inverse demultiplexing devices; and
a plurality of forwarding devices each coupled to the inverse multiplexing device via a respective one of the plurality of communication channels, and arranged to distribute the inversely multiplexed stream of multicast messages to the plurality of inverse demultiplexing devices, and wherein each of said forwarding devices are arranged to receive and store subscription information that indicates which of the multicast subscriber devices have subscribed to the stream of multicast messages, and the plurality of forwarding devices are arranged to use the subscription information to control to which of the plurality of inverse demultiplexing devices respective parts of the inversely multiplexed stream are forwarded that are received via respective ones of the communication channels, and wherein each of the inverse demultiplexing devices is adapted to:

receive the multiple parts of the multicast messages of the inversely multiplexed stream distributed by the plurality of forwarding devices, and
inverse demultiplex the multiple parts of the multicast messages to render the stream of multicast messages.

* * * * *

UNITED STATES PATENT AND TRADEMARK OFFICE
CERTIFICATE OF CORRECTION

PATENT NO. : 8,699,395 B2  Page 1 of 1
APPLICATION NO. : 11/575054
DATED : April 15, 2014
INVENTOR(S) : Jan Herman Laarhuis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1716 days.

Signed and Sealed this

Twenty-ninth Day of September, 2015

Michelle K. Lee
*Director of the United States Patent and Trademark Office*